Patented Oct. 5, 1948

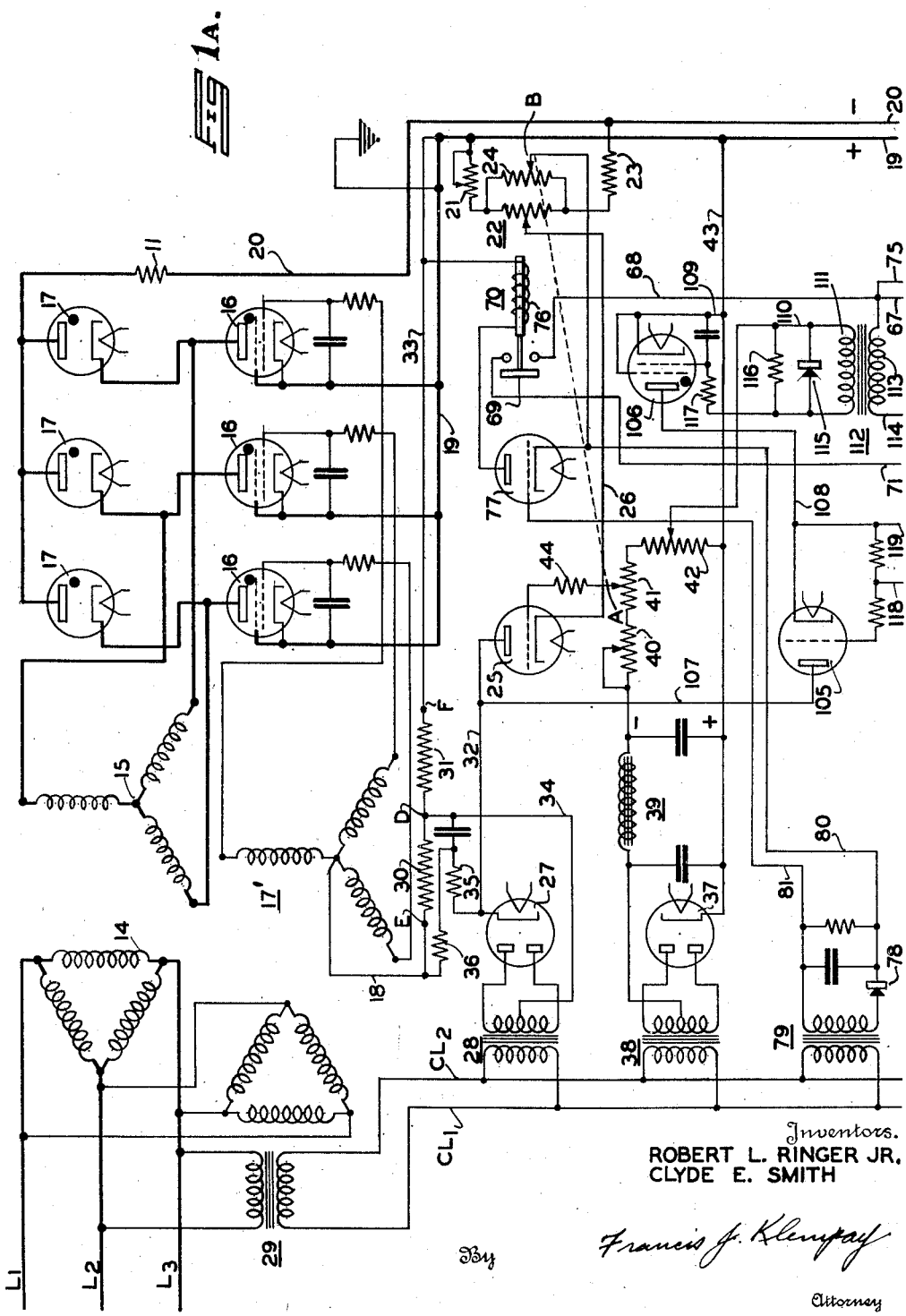

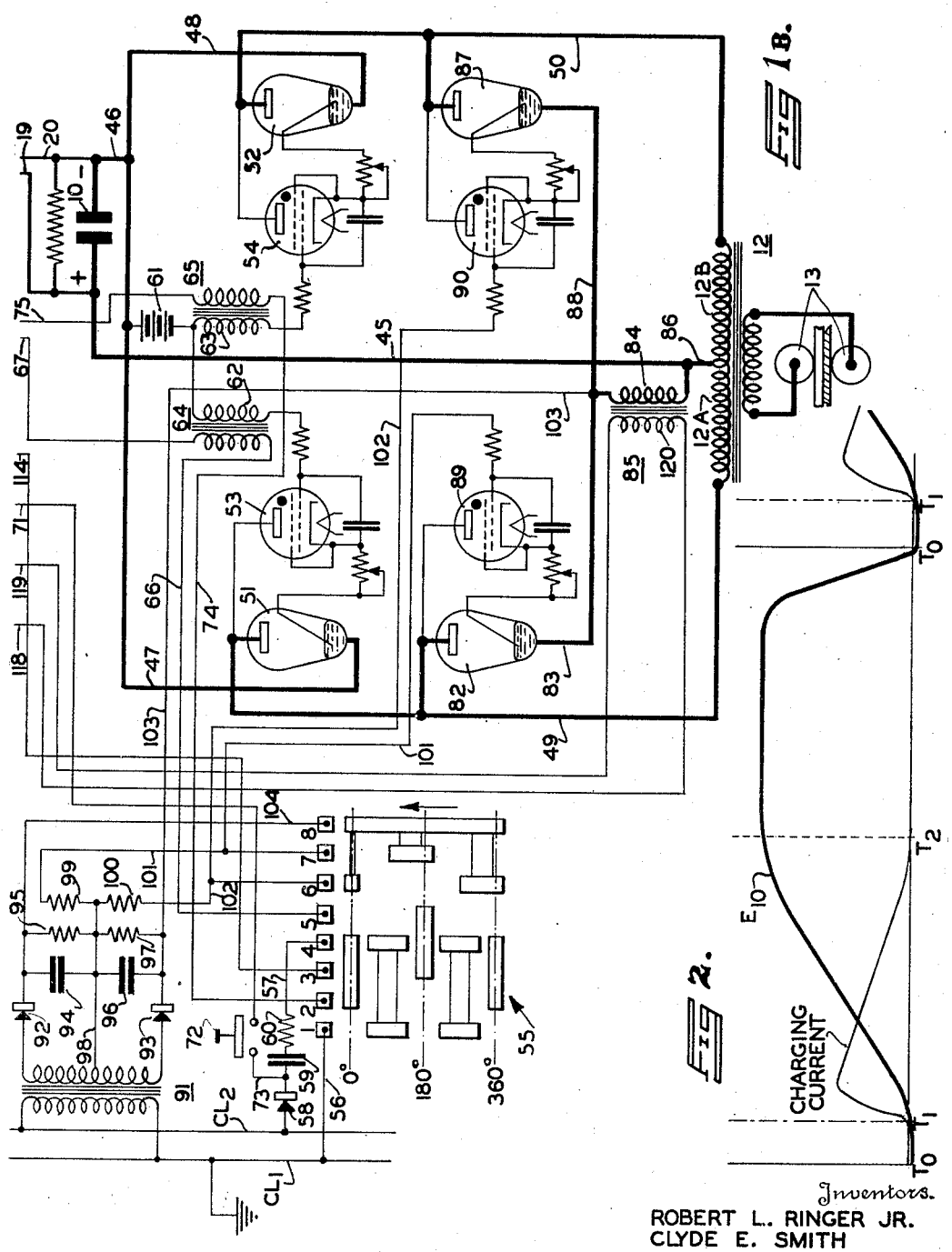

2,450,614

UNITED STATES PATENT OFFICE 2,450,614

WELDING SYSTEM

Robert L. Ringer, Jr., Warren, and Clyde E. Smith, Port Homer, Ohio, assignors to The Taylor-Winfield Corporation, Warren, Ohio, a corporation of Ohio Application December 4, 1942, Serial No. 467,854

22 Claims. (Cl. 219—4)

This invention relates to the art of electric welding and more particularly to welding systems in which a capacitor or a bank of capacitors is employed to accumulate and store the welding energy which is subsequently discharged through the welding load to effect the weld as is well understood in the art. In certain systems of this general character it is desirable to disconnect the capacitor charging circuit or to otherwise interrupt the flow of charging current during the discharge of the capacitor through the welding load and it has heretofore been proposed to accomplish such disconnection or interruption upon the actuation of the conduction means which electrically connects the capacitor with the welding load. This mode of operation may be effected in different ways, as, for example, where the charging source utilizes grid-controlled rectifiers, the rectifiers may be driven to cut-off upon the establishment of the capacitor discharge circuit.

If the maximum productive capacity of the welding machine employing the capacitor discharge principle is to be attained and the capacity of the charging system is to be kept within practicable limits, it is essential that as much as possible of the total elapsed time between successive welds be utilized in charging the main welding capacitor. This necessitates the rapid re-establishment of the charging current flow upon completion of the discharge of the capacitor and while heretofore various means have been employed to re-establish the flow of charging current upon the completion of successive welding operations these means each involve a considerable time delay between the completion of the discharge of the capacitor and the resumption of the flow of charging current. It is the principal object of the present invention to provide improved arrangements for re-establishing the flow of charging current upon the completion of the discharge of the welding capacitor whereby unnecessary time delay in the operation of the welding machine is substantially eliminated.

Normally the welding load circuit is inductive and this circuit together with the capacitor, which is connected in series therewith during discharge, constitutes, in effect, an oscillatory tank circuit which requires a uni-directional current path in shunt with the load to avoid the impression of a reverse charge on the capacitor as is well understood in the art. The above principal object of the invention is accomplished, primarily by re-establishing the flow of charging current in response to and immediately upon the reversal of polarity in the inductive welding load. Thus, in the preferred embodiment of the invention, which embodiment utilizes a separate shunt circuit including a rectifier to provide the above mentioned shunt path, means is provided to re-establish the charging current flow immediately upon the appearance of current flow in this shunt circuit and the capacitor is charged even while the energy stored in the inductive load is being dissipated through the shunt circuit.

A more specific object of the invention is the provision of an improved and substantially simplified arrangement for controlling the flow of charging current to the main welding capacitor in such manner that the voltage to which the capacitor is charged will be accurately controlled and maintained while the charging current will be entirely interrupted during the discharge of the capacitor but re-established immediately upon the completion of the discharge. In accordance with the preferred embodiment of the invention, this more specific object is accomplished by employing a grid-controlled rectifier as the source of charging current and normally controlling the grid bias on this rectifier in accordance with the voltage attained by said capacitor while providing additional means to affect the grid bias in such manner that the rectifier is blocked upon the initiation of discharge on the capacitor and unblocked, thereby restoring normal control, immediately upon completion of the discharge from the capacitor.

A further object of the invention is the provision of an improved and simplified arrangement for guarding against the discharge of the welding capacitor through the welding load if the capacitor has not reached a charge for which the system has been adjusted in consideration of the nature of the work at hand. It is proposed, in accordance with the present invention, to physically couple a movable control element which determines the capacitor voltage to be attained and maintained by the charging current source under the control of the normal charging current control device with a second movable control element which determines the voltage required to be attained by the capacitor before an additional means is operative to allow conduction in the discharge circuit. Thus, the operation of the system is materially simplified since the operator, in setting the voltage on the capacitor, automatically and simultaneously adjusts the means which prevents operation of the discharge circuit unless the capacitor is properly charged.

Another object of the invention is the provision, in a capacitor discharge welding system, of an improved arrangement for controlling the discharge of the capacitor in successive welding operations whereby the energy impulses from the capacitor may be more closely correlated with the operation of the mechanical parts of the complete welding machine so that a high rate of production and greater uniformity in the completed work may be attained. This feature of the invention, in its broader aspects, is particularly applicable in the adaption of the capacitor discharge welding principle to a welding machine employing roller electrodes with or without means, other than the electrodes, if driven, to progress the work relative to the interstice between the electrodes. It is proposed to time or synchronize the successive discharges of the capacitor with the movement of the roller electrodes or other means to draw the work through the aforesaid interstice.

Yet another object of the invention is the provision, in a capacitor discharge welding system employing a welding transformer, of an improved arrangement for preventing saturation of the saturable iron core of the transformer. For this purpose, the primary winding of the transformer is preferably center-tapped thus providing two sections and the switching mechanism employed in the capacitor discharge circuit is operative to discharge the capacitor into alternate sections and thus in opposite directions in successive welding operations. Shunt rectifiers, providing shunt circuits for each of the sections to conduct the energy stored in the respective sections upon completion of the successive capacitor discharges are controlled in proper sequence relative to the periods of conduction in the main series connecting devices. In the more specific phase of the invention this sequencing is accomplished by a suitable timer, which, as will be understood, is advantageously interlocked with the operation of the mechanism parts of the complete welding machine. Thus, improved and automatic operation may be attained by comparatively simple mechanism; a number of functions, including the correlation of the time of capacitor discharging with the position of the work, the discharging of the capacitor through the welding transformer in opposite directions on succeeding impulses, and the proper timing of conduction in the shunt rectifiers whereby the shunt circuit for the particular winding section being energized is established while the shunt circuit for the other section is blocked, being all accomplished by a unitary device which may take the form of a simply constructed rotating commutator.

The above and other objects and advantages of the invention will become apparent upon a consideration of the following detailed specification and the accompanying drawing wherein there is specifically disclosed a preferred and practical embodiment of the invention.

In the drawing:

Figure 1, consisting of parts 1A and 1B, is a diagram of a capacitor powered welding system constructed in accordance with the principles of the invention; and Figure 2 is a set of curves illustrating one principle of operation of the invention.

In the specific embodiment of the invention chosen for illustration purposes the power capacitor 10 is arranged to be charged by a full-wave, three-phase bridge connected rectifier circuit and to be discharged through a welding transformer 12 the secondary of which is connected to the welding electrodes 13, herein shown as wheel or roller electrodes. The three-phase source of alternating current, comprising the line conductors L1, L2 and L3, feeds the rectifier through a transformer having a delta connected primary winding 14 and a Y connected secondary 15. The discharge devices employed in the rectifier network are preferably of the gas or vapor-filled type and to provide for the regulation of the output of the rectifier one of the discharge devices in each phase is provided with a control electrode, these discharge devices being shown in the drawing at 16 as being grid-controlled gas or vapor-filled discharge devices. The oppositely connected valves employed in the rectifier network are gas or vapor-filled diodes 17. While the particular transformer and rectifier arrangement shown is best suited for the purpose of charging the power capacitor 10 to the required high voltage the operation of the invention is not dependent on any specific charging system although in connection with certain features of the invention some sort of charging control is required.

The energization of the discharge devices 16 is controlled by controlling the biasing potential of their respective control grids and the grid biasing potentials applied to the respective devices are the resultants of an alternating component furnished by a delta-Y connected transformer 17 and a direct current component impressed through a conductor 18 which is connected to the center point of the Y-connected secondary of the transformer 17. A conductor 19, constituting the positive terminal of the output of the rectifier system, connects with the cathodes of each of the valves 16 and leads to the positive terminal of the capacitor 10 while a conductor 20 having a current limiting device interposed therein, preferably a resistor 11, connects with the anodes of the diodes 17 and leads to the negative terminal of the power capacitor 10.

Connected across the conductors 19 and 20 is a variable resistance 21, a potentiometer 22, and a resistance 23, all in series. In parallel with the potentiometer 22 is a potentiometer 24. The movable tap of the potentiometer 22 is connected, through the conductor 26, directly to the cathode of a high-vacuum space discharge device 25. A source of direct current for the anode-cathode circuit of the control device 25 is provided by a full-wave rectifier 27 fed by the secondary of a transformer 28, the primary of which is connected to the control line conductors CL1, CL2. This control current line may be conveniently energized through a transformer 29 having its primary connected to two of the conductors of the principal three-phase supply line. Across the conductors 18 and 19 are the series resistors 30 and 31, the former having terminals E and D, and the latter having terminals D and F, and the anode-cathode circuit for the control device 25 may be traced from the cathode of rectifier 27 through conductor 32, anode-cathode of device 25, conductor 26, potentiometer 22, resistance 21, conductor 19, conductor 33, resistance 31 from F to D, and conductor 34 to the center tap of the secondary of transformer 28. The cathode of the rectifier 27 is also connected, through the resistors 35 and 36, with the conductor 18 so that normally a positive direct current biasing potential is applied through the secondaries of the transformer 17 to the control grids of the valves 16 to render the latter conducting.

Control device 25 is provided with an adjustable but normally constant control grid biasing potential by means of the following circuit: A second source of direct current potential is provided by the full-wave rectifier 37 supplied from the control current line through the transformer 38 and acting through the filter 39. Connected across the output terminals of the rectifier 37 and filter 39 is a variable resistance 40 and the potentiometers 41 and 42, in series, and the positive output terminal is connected directly with the conductor 19 through the conductor 43. The movable tap of the potentiometer 41 is designated by the letter A and the grid biasing circuit for the control device 25 may be traced from the cathode thereof through conductor 26, the positive end of potentiometer 22, variable resistance 21, conductor 19, conductor 43, potentiometer 42, potentiometer 41 to A, and then through the grid resistor 44 to the grid of the tube 25. Normally the fixed grid bias is such as to hold the tube 25 in a substantially non-conducting state. However as the rectifier develops an increasing potential across the conductors 19 and 20 the tap at the potentiometer 22 becomes progressively more negative and when a predetermined potential difference across the conductors 19 and 20 is reached, the tube 25 begins to conduct and passes progressively heavier current as the potential difference increases. This current produces a variable voltage drop across the resistance 31 from F to D and when this drop becomes greater than the voltage drop in the resistor 30 from E to D as impressed by the rectifier 27, the point E and consequently the conductor 18 will become more negative thereby decreasing the length of the conduction periods in the valves 16. This regulation may continue to the point where the valves 16 will completely cut off but normally trickle charging takes place to compensate for losses in the system.

For the purpose of discharging the energy stored in the capacitor 10 into the welding transformer 12 the latter may be provided with a center-tapped primary winding to facilitate the discharge of current in alternate directions in each succeeding impulse thereby avoiding saturation of the transformer core. One terminal of the capacitor 10 is permanently and directly connected to the center tap of the primary winding through the conductor 45. The conductor 46 leading from the other terminal of the capacitor 10 is branched into conductors 47 and 48 which are arranged to be connected to the conductors 49 and 50, respectively, through valves 51 and 52, respectively. It will be observed that the conductor 49 leads to the outer terminal of the primary winding section 12A while the conductor 50 leads to the outer terminal of the transformer primary section 12B. Thus upon conduction in valve 51 capacitor 10 will be discharged through conductor 45. Winding section 12A, conductor 49, valve 51, and conductor 47 to the other side of the capacitor while conduction in valve 52 will discharge the capacitor through the welding transformer in the opposite direction, i. e., through the winding 12B. Valves 51 and 52 are preferably of the cathode pool type employing an ignition or starting electrode of the electrostatic or other suitable type and to energize the ignition electrodes a control or "trigger" tube is associated with each of the principal valves. Thus a control device, preferably a gas-filled grid-controlled space discharge device 53 has its cathode connected with the ignition electrode of the valve 51 and its anode connected to the anode of said valve and to the conductor 49. Likewise a gas-filled grid-controlled device 54 has its cathode connected to the ignition electrode of the valve 52 and its anode connected to the anode of said valve and to the conductor 50. The control or "firing" devices 53 and 54 are, regardless of the particular application of the circuit or system, arranged to be rendered alternately conducting in successive welding operations. In the particular complete system chosen for illustration these alternations are effected by a synchronously driven mechanical timer as will be explained in detail below, but it should readily be understood as the description proceeds that this alternation may be accomplished by other mechanical or electrical means. For example, in an automatically operated spot welder in which a movable electrode is reciprocated into and out of engagement with the work, the switching may be accomplished synchronously with reciprocating movement of the quill carrying the movable electrode.

Reference numeral 55 designates a rotatable commutator having bars positioned thereon and interconnected as shown. It will be understood that the commutator is preferably synchronously driven, preferably in relation to the drive of the wheel electrodes 13, or if the latter are not driven then in relation to the moving means employed to progress the work through the machine. The commutator is provided with brushes numbered 1 through 8 positioned in relation to the commutator bars as shown. Conductor 56 connects brush 1 with conductor CL1 of the control current supply line and a conductor 57 having a rectifier 58, a capacitor 59, and a current limiting device preferably a resistance 60 interposed in series therewith interconnects brush 4 and the line conductor CL2. It should therefore be clear that during the greater part of each cycle of operation rectifier 58 is operative to charge the capacitor 59. Impulses of energy from capacitor 59 are utilized, in timed sequence, to overcome the normal negative bias appearing at the grids of the control devices 53 and 54 to render the same conducting.

Normal negative grid bias for the control devices 53 and 54 is furnished by a suitable potential source, for example the battery 61, having its positive terminal connected to the cathodes of the devices through the conductors 47 and 48, in series with the ignition electrodes of valves 51 and 52, respectively, and its negative terminal joined with the grids of the devices through the secondary windings 62 and 63, respectively, of impulse transformers 64—65, respectively. The primary winding of transformer 64 is in a circuit which may be traced from commutator brush 5 through conductor 66, conductor 67, conductor 68, contactor 69 of relay 70 (the function of which will be explained below), conductor 71, switch 72, conductor 73, and through capacitor 59, resistor 60 and conductor 57 to brush 4. Upon rotation of the commutator approximately 180° brushes 4 and 5 will be joined whereby capacitor 59 will be discharged through transformer 64 to overcome the negative grid bias appearing at the control device 53, enabling it to conduct. This conduction energizes the ignition electrode of valve 51 thereby rendering the valve conductive to discharge the main capacitor 10 through the winding 12A of the welding transformer primary. Likewise, the primary winding of transformer 65 is in a circuit which may be traced from commutator brush 2 through conductor 74, conductor 75, and thence through conductor 68, relay contacts 69, conductor 71, contacts 72, conductor 73, capacitor 59, resistor 60 and conductor 57 to brush 4. Upon the joining of brush 4 with brush 2 valve 52 will be rendered conductive to discharge capacitor 10 through primary winding 12B.

Switch 72, located in the common operating circuit explained above may be closed either manually or automatically in response to the attainment of certain conditions required for the safe or satisfactory operation of the complete welding assembly. It is also highly desirable that the welding system be prevented from operating or the power capacitor be prevented from discharging through the work unless the power capacitor has attained the charge set for it in consideration of the character of the work at hand. This is the function of the relay 70, the operating coil 76 of which requires a current of predetermined strength to close the contactor 69. The strength of current flowing in coil 76 is controlled by a space discharge device 77 having an anode, a cathode and a control electrode. A constant grid biasing potential is furnished by a rectifier 78 deriving energy from the control current line through transformer 79, it being observed that the cathode of device 77 is connected directly to the positive terminal of the output of rectifier 78 through conductor 80 while the control grid is connected to the negative end through the conductor 81. The cathode of device 77 is connected to the center tap B of the potentiometer 24 and it will be understood that as the potential difference across the conductors 19 and 20 increases, the potential at point B will become progressively more negative, in opposition to the control bias on device 77, thereby enabling the device to conduct more current. As the charge on the main capacitor 10 approaches or reaches the value for which it has been set by adjustment of the tap A of potentiometer 41, tube 77 conducts sufficient current to pull in relay 70 and close the contactor 69 thereby conditioning the system for operation. The potentiometers 41 and 24 are ganged together, as indicated on the drawing, to provide a practical, but simple, arrangement for simultaneously controlling the total quantity of energy to be delivered by the power capacitor and insuring that the machine will not be operated or the power capacitor discharged unless and until such quantity of energy is present in the power capacitor.

While it has been heretofore proposed to provide a heavy current rectifier in shunt with the primary winding of the welding transformer to prevent the appearance of inverse voltage on the principal power capacitor when the discharge circuit constants are such that oscillation therein tends to occur, the problem of so avoiding the reversal of potential on the capacitor did not involve the complications arising from the discharging of the capacitor through the transformer in alternate directions. According to the present invention the advantageous use of the shunt rectifier is permitted, although the current is caused to flow through the welding transformer in alternate directions, by alternately blocking and unblocking the shunt rectifiers employed, in timed relation to the periods of conduction of the principal discharging valves. In the embodiment illustrated, an electric discharge device 82, preferably of the cathode pool type employing an ignition or starting electrode is connected in shunt with the winding 12A of the primary of welding transformer 12 through the conductor 49, conductor 83, primary winding 84 of the transformer 85 and conductor 86. A similar device 87 is connected across the winding 12B through conductor 50, conductor 88, winding 84, and conductor 86. It will be apparent that if the ignition electrodes of the valves 82 and 87 are energized by conventional ignition tube circuits the auto-transformer action between the winding sections 12A and 12B would render the shunt rectifier for one of the sections conductive thus shorting this section while the capacitor is discharging through the other section. To avoid this condition the shunt ignition tubes are alternately blocked and unblocked at the proper instants. This requires controlled ignition devices and, if space discharge devices are employed to time the ignition, alternate positive and negative biasing potential, which polarity correction is accomplished automatically, preferably by the commutator above mentioned.

Associated with the valve 82 is a controlling or "firing" device 89, preferably of the gas-filled grid-controlled type, and a similar device 90 is associated with the valve 87. A source of biasing potential for the device 89 and 90 is provided by a transformer 91 having its primary connected to the control current line and its secondary connected to rectifiers 92 and 93 as indicated in the drawing. Connected across the output of rectifier 92 is a capacitor 94 and a load resistor 95. Connected across the rectifier 93 is a similar capacitor 96 and a load resistor 97 of much less value than the resistor 95. The common negative terminal 98 of these potential sources is connected through equal resistances 99 and 100 and conductors 101 and 102 to the control grids of the devices 89 and 90, respectively. The cathodes of devices 89 and 90 are connected through the ignition electrodes and cathodes of their associated valves 82 and 87, through the conductors 83 and 88, and through the conductor 103 to the positive terminal on rectifier 93 thus providing a normal negative bias for the devices 89 and 90. It should be observed that conductor 101 is connected to commutator brush 7 and that conductor 102 is connected to commutator brush 6. The positive end of resistor 95 is connected through conductor 104 to brush 8 of the commutator assembly and by referring to the plan of the movable commutator bars it will be understood that for a time prior to and at the time of interconnection between brushes 2 and 4 and the consequent conduction in valve 52 the conductor 102 will be connected with the conductor 104 through the brushes 6, 8 thereby driving the grid bias of the control tube 90 positive to condition the shunt valve 87 for conduction upon reversal of polarity in the winding 12B. During this time interval, however, negative bias is maintained on the grid of the control tube 89 to hold the shunt valve 82 non-conductive thereby preventing the shorting of the primary section 12A while current is flowing through section 12B. Likewise, upon the recharging of the condenser 59 and the arrival of the instant at which the main capacitor 10 is to be discharged through the primary winding section 12A the negative bias on control tube 90 will have become re-established and the bias on control tube 89 will have been driven positive by interconnection between brushes 7 and 8 thereby conditioning valve 82 for conduction while blocking valve 87.

Another important feature of the invention is, as stated above, the control of the charging of the main power capacitor 10 in accordance with or in synchronism with the operation of the main power discharge circuits whereby the lengths of the periods of interruption of the flow of charging current to the power capacitor is kept to the absolute minimum so that the welding machine embodying the invention may be operated at its highest possible rate of speed. As stated above, this object is accomplished in accordance with the preferred and illustrated embodiment of the invention by employing a controllable charging rectifier and blocking the rectifier only during the very short interval of time that the main series discharge valve in the power discharge circuit is actually conducting. Restoration of charging is effected, in accordance with the illustrated and preferred embodiment of the invention, by unblocking the charging rectifier immediately upon the reversal of polarity in any part of the discharge circuits. The discharge circuit oscillatory frequency being normally fairly high, it may be said that the recharging commences at the instant of the completion of the initial discharge of the welding power capacitor. This mode of operation is accomplished by the circuits now to be described.

Connected across the control device 25 which governs the direct current component of biasing potential impressed on the controlled rectifiers 16 through conductor 18 is a high-vacuum triode 105 in series with a gas-filled grid-controlled discharge device 106, the anode-cathode circuit of these tubes being traceable from the cathode of rectifier 27, through conductor 32, conductor 107, anode-cathode of tube 105, conductor 108, anode-cathode of tube 106, conductor 109, conductor 43, conductor 19, conductor 33, and through resistance 31 and conductor 34 to the other side of the rectifier 27. Normal negative grid biasing potential is impressed on the discharge device 106 through the conductor 110 leading from the movable tap of the resistor 42. Interposed in this conductor is the secondary winding 111 of transformer 112, the primary 113 of which is in parallel with the primary of each of the impulse transformers 64 and 65 so that upon the actuation of either of the control devices 53 and 54, an impulse will be transmitted through the transformer 112. It will be observed that one terminal of winding 113 is connected to the conductor 68 while the other terminal thereof is connected through conductor 114 with brush 3 of the commutator and that the discharge bars on the commutator are so positioned as to interconnect brushes 3 and 4 during each discharge operation. The rectifier 115 is connected across the secondary 111 of transformer 112 so that potential of proper polarity derived from the impulse may be developed across the resistance 116 with the positive end thereof connected to the control grid of the tube 106 through resistor 117. At the time when an impulse appears at the transformer 112 tube 105 is at zero bias so that the impulse immediately renders the tube 106 conductive thereby creating a current flow in the anode-cathode circuit traced above. This circuit, having less impedance than the anode-cathode circuit of the control tube 25, will create a much higher potential drop across the resistor 31 from F to D thereby driving the control grids of the rectifier valves 16 highly negative and interrupting entirely the flow of current from the charging rectifier system.

The discharge device 106 continues to conduct even after the termination of the impulse at the transformer 112 and the charging rectifier valves remain blocked. Connected across the grid and cathode of the triode 105 through conductors 118 and 119, respectively, is the secondary winding 120 of the transformer 85 so that at the time the voltage reverses in the particular welding transformer primary section into which the main power capacitor is discharged and current begins to flow through valve 82 or 87, an impulse will appear in the secondary 120 which will drive the grid of tube 105 highly negative thereby interrupting conduction in said tube whereupon the gas in tube 106 will de-ionize. This action restores the voltage at D thus unblocking the rectifiers 16 and enabling the rectifiers to immediately commence the recharging of the main capacitor 10.

It should now be apparent that we have provided an improved welding system of the capacitor discharge type which accomplishes the objects initially set out. Specifically, the invention reduces the time of charging current interruption at each welding cycle to a very short interval thus utilizing the highest possible efficiency of the charging system while increasing the rate of production of the welding machine. By referring to Figure 2, the curves of which were taken from an oscillogram and which show the relation of the voltage on the main welding capacitor (E10) and the charging current with respect to time, it will be observed that as the voltage approaches the value for which the control 22, 25 is set the charging current approaches zero. This time is indicated at T2 and is the point at which the relay 70 is closed. T0 is the instant the relay opens and T1 is the instant the reestablished charging current flow becomes perceptible. The curves show the uni-directional character of the capacitor discharge. The time interval between the approach of E10 to zero and the perceptible rise of the charging current is not more than one cycle of a 60 cycle/sec. reference frequency, as measured on the oscillograph, and is the result of inductive lag in response accumulated in the control and test circuits. The discharge hold-off arrangement, the normal charging control system, and the feature of interlinking this arrangement and system all contribute to a simplified and practical circuit and facilitates the monitoring of the operation of the machine. The invention also demonstrates the practicability of applying the capacitor discharge welding principle, with its attendant problems and decided advantages, to high speed welding machines having various arrangements of mechanical parts. The invention particularly teaches the correlation of the welding impulses with operation of the mechanical parts of the machine while providing for the use of a welding transformer and means to prevent saturation of the core of the transformer.

The above described embodiment of the invention should be taken merely as exemplary since it is susceptible of wide and varying modification within the purview of the invention and the scope and spirit of the appended claims. Thus charging rectifier systems other than that shown and/or other means to block the flow of charging current to the capacitor may be employed. The charging current blocking circuit instead of being connected across the normal charging current control device may operate to radically affect the operation of said device inherently or may accomplish its function entirely independent of said normal control device. The described capacitor discharge and shunt rectifier devices may be replaced by equivalent means and insofar as certain of the broader aspects of the invention is concerned many of the parts, with their functions, may be dispensed with in the welding system.

While we have shown a center tap welding transformer to facilitate the reversal of current flow therethrough, the disclosed system of control involving grid blocking, particularly with respect to the shunt rectifiers, may be utilized in connection with mechanical arrangements for reversing the primary of the welding transformer or with other flux reversing schemes.

Our invention, therefore, is not to be restricted except insofar as necessitated by the prior state of the art involved.

What we claim is:

1. An electrical system comprising a capacitor, means comprising a controllable rectifier to charge said capacitor, an inductive load circuit, means to discharge said capacitor through said circuit, means operative upon actuation of said means to discharge to control said rectifier in such manner that the output thereof is interrupted, and means operative in response to the reversal of polarity in said circuit to re-establish conduction in said rectifier.

2. An electrical system comprising a capacitor, means comprising a grid-controlled rectifier to charge said capacitor, an inductive load circuit, means to discharge said capacitor through said circuit, means operative upon actuation of said means to discharge to drive the control grid of said rectifier highly negative to interrupt operation of said rectifier, and means operative in response to the reversal of polarity in said circuit to re-establish normal potential on said grid whereby conduction in said rectifier is re-established.

3. An electrical system comprising a capacitor, means to charge said capacitor, an inductive load circuit, means to discharge said capacitor through said circuit, means operative upon actuation of said means to discharge to block the flow of charging current to said capacitor, and means operative in response to the reversal of polarity in said circuit to re-establish the flow of charging current to said capacitor.

4. An electrical system comprising a capacitor, a source of charging current for said capacitor, an inductive load circuit, means to discharge said capacitor through said circuit, means operative during said discharge to interrupt said source, and means operative in response to the reversal of polarity in said circuit to re-establish said source of charging current.

5. An electrical system comprising a capacitor, a source of charging current for said capacitor, an inductive load circuit, means to discharge said capacitor through said load circuit, a circuit including a rectifier in shunt with said load circuit, means operative during said discharge to interrupt said source, and means operative in response to the flow of current in said shunt circuit to re-establish said source of charging current.

6. An electrical system comprising a capacitor, a source of charging current for said capacitor, an inductive, load circuit, means comprising a controlled discharge device to discharge said capacitor through said load circuit, control means to render said device conductive, means operable simultaneously with actuation of said control means to interrupt said source, and means operative immediately upon completion of said discharge and in response to the appearance of inverse potential in said load circuit to re-establish said source of charging current.

7. An electrical system comprising a capacitor, a source of charging current for said capacitor, an inductive load circuit, means comprising a controlled discharge device to discharge said capacitor through said load circuit, a circuit including a rectifier in shunt with said load circuit, control means to render said device conductive, means operable simultaneously with actuation of said control means to interrupt said source, and means responsive to the initiation of flow of current in said shunt circuit to re-establish said source of charging current.

8. An electrical system comprising a capacitor, a charging circuit therefor, an inductive load circuit, a discharge circuit adapted to interconnect said capacitor and load circuit, a circuit including a rectifier shunted across said load circuit, a control circuit in control of the flow of charging current in said charging circuit and comprising a grid-controlled space discharge device and a gas-filled grid-controlled discharge device in series which is operative upon conduction therein to block the flow of charging current in said charging circuit, means connected to the grid of said gas-filled device to initiate conduction in said control circuit upon the initiation of conduction in said discharge circuit, and means connected to the grid of said space discharge device to interrupt conduction in said control circuit upon the initiation of conduction in said shunt circuit.

9. Apparatus according to claim 8 further characterized in that said charging circuit comprises a grid-controlled rectifier, said control circuit being operative, when current is flowing therein, to drive the grid biasing potential impressed on said last named rectifier highly negative thereby blocking said last named rectifier.

10. In an electrical system having a capacitor, a charging circuit therefor, and an inductive load circuit adapted to be energized by said capacitor; means to control said charging circuit comprising a grid-controlled space discharge device and a gas-filled grid-controlled discharge device in series, means to maintain an anode-cathode potential on said devices, means responsive to the flow of current in said discharge circuit to initiate conduction in said gas-filled device and consequently also in said space discharge device, and means operative upon completion of the discharge of said capacitor through said load circuit to drive said space discharge device to cutoff.

11. In an electrical system having a capacitor, a load circuit arranged to be energized by said capacitor, and means for charging said capacitor comprising a rectifier; means to control conduction of said rectifier comprising a source of potential and a control circuit arranged to be energized thereby, means in said control circuit arranged to be actuated upon the flow of current in said load circuit to initiate and maintain conduction in said control circuit, and other means in said control circuit arranged to interrupt conduction in said control circuit upon completion of the discharge of said capacitor.

12. In an electrical system having a capacitor, an inductive load circuit arranged to be energized by said capacitor, and means to charge said capacitor; means to normally control said means to charge in response to the voltage attained by said capacitor, means operative upon the initiation of current flow in said load circuit to interrupt said normal control thereby blocking said means to charge, and means operative upon the reversal of polarity in said load circuit to restore said normal control.

13. In an electrical system having a capacitor, an inductive load circuit arranged to be energized by said capacitor, and means comprising a grid-controlled rectifier to charge said capacitor; means to control said rectifier comprising a biasing circuit, means responsive to the voltage attained by said capacitor to normally control the potential in said biasing circuit, means operative upon the initiation of current flow in said load circuit to vary the potential in said control circuit in such manner that said rectifier is blocked, and means operative in response to the reversal of polarity in said load circuit to interrupt the operation of said means to vary thereby restoring said normal control.

14. In a capacitor discharge welding system having an inductive welding load, the method of operation which consists of dissipating through a shunt circuit the energy stored in said load upon completion of the discharge of the capacitor whereby the appearance of substantial reverse potential at said capacitor is prevented, interrupting the charging of said capacitor during said discharge, and beginning the recharging of said capacitor substantially simultaneously with the reversal of polarity in said load.

15. In a capacitor discharge welding system having an inductive welding load, the method of operation which consists of discharging the capacitor through the load, preventing the appearance of substantial reverse voltage at said capacitor, interrupting the charging of said capacitor during said discharge, and beginning the recharging of said capacitor substantially simultaneously with the reversal of polarity in said load.

16. In a capacitor discharge welding system having a capacitor and a welding transformer, the combination of means to initiate discharge of the capacitor through the primary winding of said transformer in alternate directions during successive welding operations, and commutating means independent of transient electrical conditions in said primary winding to establish a current path in shunt with said primary winding in alternate directions during successive welding operations and simultaneously with actuation of said means to initiate whereby the appearance of inverse voltage at said capacitor is prevented during each welding operation regardless of the direction of discharge through said primary winding.

17. In a capacitor discharge welding system having a capacitor and a welding transformer with a center-tapped primary winding, a conductor connecting one terminal of the capacitor with said center tap, means to alternately connect the end terminals of said winding to the other terminal of said capacitor during successive welding operations, means providing a shunt unidirectional current path for each section of said winding, and commutating means independent of transient electrical conditions in said primary winding for rendering said shunt paths alternately conductive and non-conductive during successive welding operations and simultaneously with actuation of said means to connect whereby the appearance of inverse voltage at said capacitor is prevented and the shunt path for the unused section of said winding is held open during each welding operation regardless of which section of said winding is being used.

18. In a capacitor discharge welding system having a capacitor and a welding transformer with a center-tapped primary winding, a conductor connecting one terminal of the capacitor with said center tap, electric discharge devices connecting the other capacitor terminal with each of the end terminals of said winding, electric discharge devices in shunt with said center tap and each end terminal of said winding, means to render said first mentioned devices alternately conductive in successive welding operations, and commutating means independent of transient electrical conditions in said winding and operable simultaneously with said first mentioned means to render said second mentioned devices alternatively conductive and non-conductive.

19. In a capacitor discharge welding system having a capacitor and a welding transformer, means comprising a pair of electric discharge devices to discharge said capacitor through the primary winding of said transformer in alternate directions in succeeding welding operations, means comprising a pair of controllable circuits each including a rectifier shunted across said winding, and a synchronously operated commutating device operable independently of transient electrical conditions in said winding to alternate the operation of said devices and to condition one of said circuits for conduction simultaneously with the operation of one of said devices whereby the appearance of inverse voltage at said capacitor is prevented during each successive discharge of said capacitor.

20. In combination, a capacitor, a charging rectifier for said capacitor, a load circuit, means to discharge said capacitor through said load circuit, a control circuit comprising a pair of series connected electronic discharge devices in control of the operation of said rectifier, means in control of one of said devices operable to establish a continuing electrical condition in said control circuit upon initiation of said means to discharge whereby the operation of said rectifier is interrupted and held interrupted during said discharge, and means in control of the other of said devices to disestablish said condition upon completion of said discharge.

21. In combination, a capacitor, a charging rectifier for said capacitor, an inductive load circuit, means to discharge said capacitor through said load circuit, a control circuit comprising a pair of series connected electronic discharge devices in control of the operation of said rectifier, means in control of one of said devices operable to establish a continuing electrical condition in said control circuit upon initiation of said means to discharge whereby the operation of said rectifier is interrupted and held interrupted during said discharge, and means in control of the other of said devices to disestablish said condition upon the appearance of inverse potential in said load circuit.

22. In a welding system of the capacitor discharge type and employing an inductive load circuit together with a plurality of electronic discharge devices to control the discharge of the capacitor through said circuit in alternate directions and other electronic discharge devices operative to establish circuits in shunt with said load circuit of uni-directional character in alternate directions, the combination of a source of biasing potentials operative when applied to the respective devices to condition said devices for conduction, and means distributing said potentials to said devices in timed sequence whereby upon conditioning of at least one of said first mentioned devices at least one of said second mentioned devices will be simultaneously conditioned.

ROBERT L. RINGER, JR.
CLYDE E. SMITH.

REFERENCES CITED

The following references are of record in the file of this patent:

UNITED STATES PATENTS

| Number | Name | Date |
|---|---|---|
| 1,315,239 | Pierce et al. | Sept. 9, 1919 |
| 2,294,671 | Livingston | Sept. 1, 1942 |
| 2,294,672 | Livingston | Sept. 1, 1942 |
| 2,295,293 | Rogers | Sept. 8, 1942 |